US012596697B1

(12) United States Patent
Luecking

(10) Patent No.: US 12,596,697 B1
(45) Date of Patent: Apr. 7, 2026

(54) HOLISTIC END-TO-END PROCESS DATA AUTOMATION TOOL

(71) Applicant: SAP SE, Walldorf (DE)

(72) Inventor: Thomas Luecking, Bruchsal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/010,990

(22) Filed: Jan. 6, 2025

(51) Int. Cl.
*G06F 16/00* (2019.01)
*G06F 16/22* (2019.01)
*G06F 16/2455* (2019.01)

(52) U.S. Cl.
CPC ...... *G06F 16/2246* (2019.01); *G06F 16/2456* (2019.01)

(58) Field of Classification Search
None
See application file for complete search history.

(56) References Cited

U.S. PATENT DOCUMENTS

| | | | |
|---|---|---|---|
| 11,656,744 B1 * | 5/2023 | Selitsky | G06F 3/0482 |
| | | | 715/762 |
| 2021/0157782 A1 * | 5/2021 | Amato | G06F 9/546 |
| 2024/0202552 A1 * | 6/2024 | Srivatsa | G06N 5/04 |
| 2024/0220898 A1 * | 7/2024 | Sreedharan | G06F 9/4881 |

* cited by examiner

*Primary Examiner* — Anhtai V Tran
(74) *Attorney, Agent, or Firm* — Mintz Levin Cohn Ferris Glovsky and Popeo, P.C.

(57) ABSTRACT

Arrangements for holistic end-to-end process data automation operations are provided. Process data including entity-level data and group-level data may be identified. The entity-level data may include individual tasks, and the group-level data may include sets of tasks to be executed in a predefined sequence. The group-level data may be synchronized with the entity-level data by mapping respective content and configurations. A logical tree structure for the entity-level data and the group-level data may be generated. The generating may include dividing, via a topmost sub-hierarchy layer, the logical tree structure into a first subtree of nodes representing the entity-level data and a second subtree of nodes representing the group-level data. An instance may be generated from the logical tree structure based on one of the first subtree or the second subtree. A consolidated report unifying the entity-level data and the group-level data may be output based on the generated instance.

20 Claims, 5 Drawing Sheets

200

202
IDENTIFY PROCESS DATA INCLUDING ENTITY-LEVEL DATA AND GROUP-LEVEL DATA IN A CONNECTED DATABASE SYSTEM

204
SYNCHRONIZE ENTITY-LEVEL DATA AND GROUP-LEVEL DATA, MAPPING RESPECTIVE CONTENT AND CONFIGURATIONS

206
GENERATE LOGICAL TREE STRUCTURE INCLUDING DIVIDING THE LOGICAL TREE STRUCTURE INTO A FIRST SUBTREE REPRESENTING THE ENTITY-LEVEL DATA AND A SECOND SUBTREE REPRESENTING THE GROUP-LEVEL DATA

208
GENERATE AN INSTANCE FROM THE LOGICAL TREE STRUCTURE BASED ON THE FIRST SUBTREE OR THE SECOND SUBTREE

210
OUTPUT A CONSOLIDATED REPORT, BASED ON THE GENERATED INSTANCE, UNIFYING THE ENTITY-LEVEL DATA AND THE GROUP-LEVEL DATA

100

Connected Database
Systems
140

End-to-End Process
Data Automation
Computing Platform
110

Network
150

User Computing
Device
120

Data and
Consolidation
Monitor
130

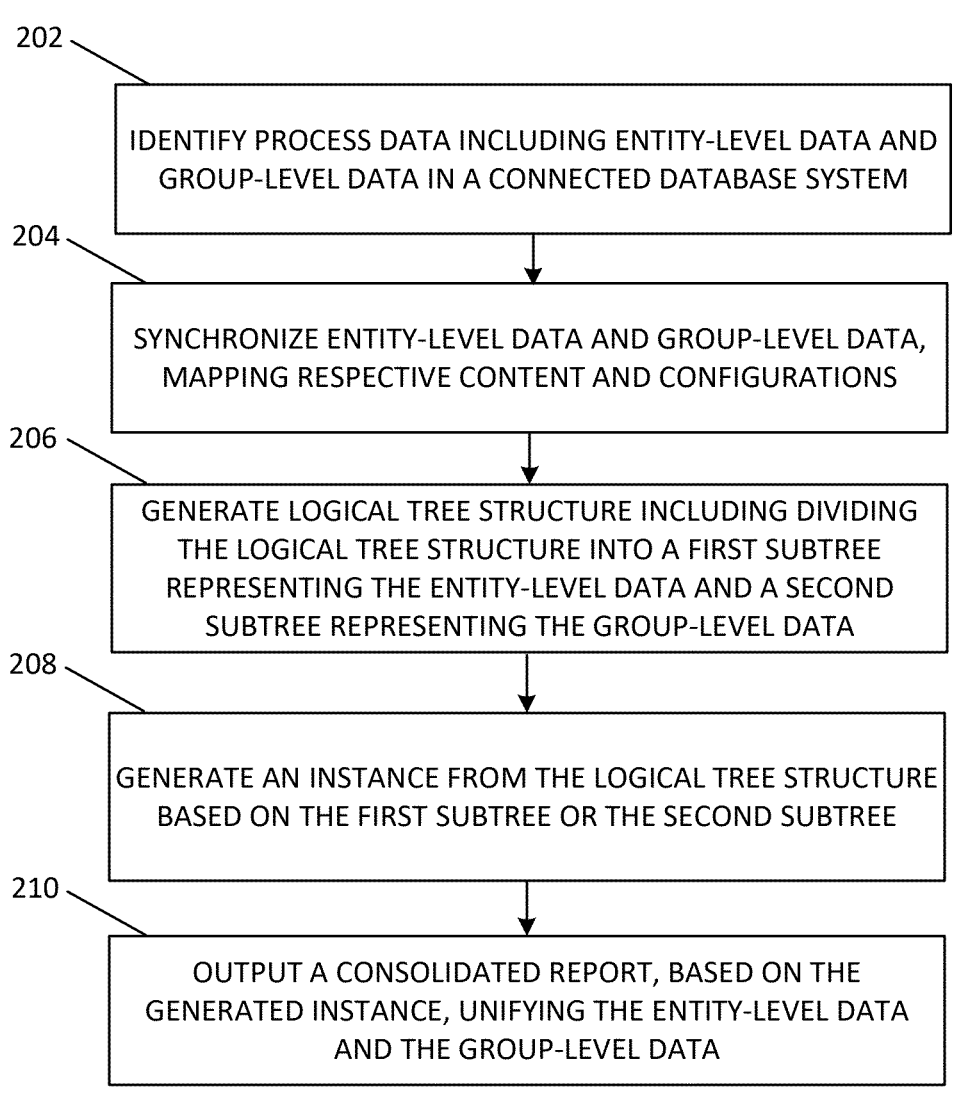

200

202

IDENTIFY PROCESS DATA INCLUDING ENTITY-LEVEL DATA AND GROUP-LEVEL DATA IN A CONNECTED DATABASE SYSTEM

204

SYNCHRONIZE ENTITY-LEVEL DATA AND GROUP-LEVEL DATA, MAPPING RESPECTIVE CONTENT AND CONFIGURATIONS

206

GENERATE LOGICAL TREE STRUCTURE INCLUDING DIVIDING THE LOGICAL TREE STRUCTURE INTO A FIRST SUBTREE REPRESENTING THE ENTITY-LEVEL DATA AND A SECOND SUBTREE REPRESENTING THE GROUP-LEVEL DATA

208

GENERATE AN INSTANCE FROM THE LOGICAL TREE STRUCTURE BASED ON THE FIRST SUBTREE OR THE SECOND SUBTREE

210

OUTPUT A CONSOLIDATED REPORT, BASED ON THE GENERATED INSTANCE, UNIFYING THE ENTITY-LEVEL DATA AND THE GROUP-LEVEL DATA

| Hierarchy Entry Point | Activities ("Consolidation Group") | | | | | | |
|---|---|---|---|---|---|---|---|
| Consolidation Group | AG1 | AG2 | AG3 | AG5 | AG7 | AG8 |
| CG1 | ● | ◉ | ◉ | ◉ | ◉ | ◉ |
| CG2 | ◉ | ◁ | ◉ | ⌄ | ◉ | ◉ |

HOLISTIC END-TO-END PROCESS DATA AUTOMATION TOOL

TECHNICAL FIELD

The subject matter described herein relates generally to data processing and, in particular, to a holistic end-to-end process data automation tool.

BACKGROUND

Oftentimes entities are required to provide a set of complete statements along with accompanying documentation for every single reporting key date. Additionally, companies must consolidate the statements of subsidiary companies into a consolidated statement to determine and publish information of a group. Currently available tools for entity related processes and group related processes are strictly separated. It may be difficult for users to have a global overview of an end-to-end process because the processes involving entity-level data and group-level data are currently spread across tools.

SUMMARY

Methods, systems, and articles of manufacture, including computer program products, for holistic end-to-end process data automation are implemented. In one aspect, a computer-implemented method includes identifying process data including entity-level data and group-level data in connected database systems, where the entity-level data includes individual tasks, and the group-level data includes sets of tasks to be executed in a predefined sequence; synchronizing the group-level data with the entity-level data by mapping respective content and configurations; generating a logical tree structure for the entity-level data and the group-level data, and the generating includes dividing, via a topmost sub-hierarchy layer of the logical tree structure, the logical tree structure into a first subtree of nodes representing the entity-level data and a second subtree of nodes representing the group-level data; generating an instance from the logical tree structure based on one of the first subtree or the second subtree; and outputting, based on the generated instance, a consolidated report unifying the entity-level data and the group-level data.

In some variations one or more of the following can optionally be included. The first subtree and the second subtree are connected according to a same root node. The sub-hierarchy layer includes a folder layer indicating a type of process data and associated tasks. Dependencies are maintained between the individual tasks associated with the entity-level data and the sets of tasks associated with the group-level data. The second subtree of nodes representing the group-level data includes consolidation units and consolidation groups, and two or more consolidation units may be merged together to form a single consolidation group. Generating an instance from the logical tree structure based on one of the first subtree or the second subtree includes generating the instance for a specific key date. Generating the consolidated report unifying entity-level data and the group-level data includes calculating a combined status for the individual tasks and the sets of tasks on a folder level.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 depicts a flowchart illustrating a process for implementing holistic end-to-end process data automation in accordance with some example embodiments;

FIG. 3 depicts a graph hierarchy illustrating holistic end-to-end process data automation in accordance with some example embodiments;

When practical, similar reference numbers denote similar structures, features, or elements.

DETAILED DESCRIPTION

Aspects of the disclosure provide a technical solution that addresses problems associated with end-to-end process data automation operations. Currently, in an entity close, only single tasks are considered and reported on. The status of each task may be tracked. However, in a group close, a combined status of such sequences is needed on a consolidation unit and consolidation group level, which is not yet in place. There is currently no way to connect the entity close and group close hierarchies. Thus, a lot of manual effort is required to organize an end-to-end close. Implementations of the current subject matter improve the functioning of the computer system by, among other things, identifying process data comprising entity-level data and group-level data in connected database systems and generating a logical tree structure for the entity-level data and the group-level data, which allow the computer to determine a combined status on all folders. Additional implementations of the current subject matter improve the functioning of the computer system by identifying one template/task list for an accurate, complete, and efficient end-to-end closing process.

One aspect of the disclosure provides a technical solution for managing the closing process for all entities in an organization, seamlessly integrating entity close and group close into a single tool. Further aspects of the disclosure allow for seamless analysis and reporting across an entire organization, eliminating the need to switch between different systems to access data at the entity level and consolidated data at the group level. Efficiency may be improved by streamlining processes such as closing processes by providing a unified view of all relevant data.

Figure 1:
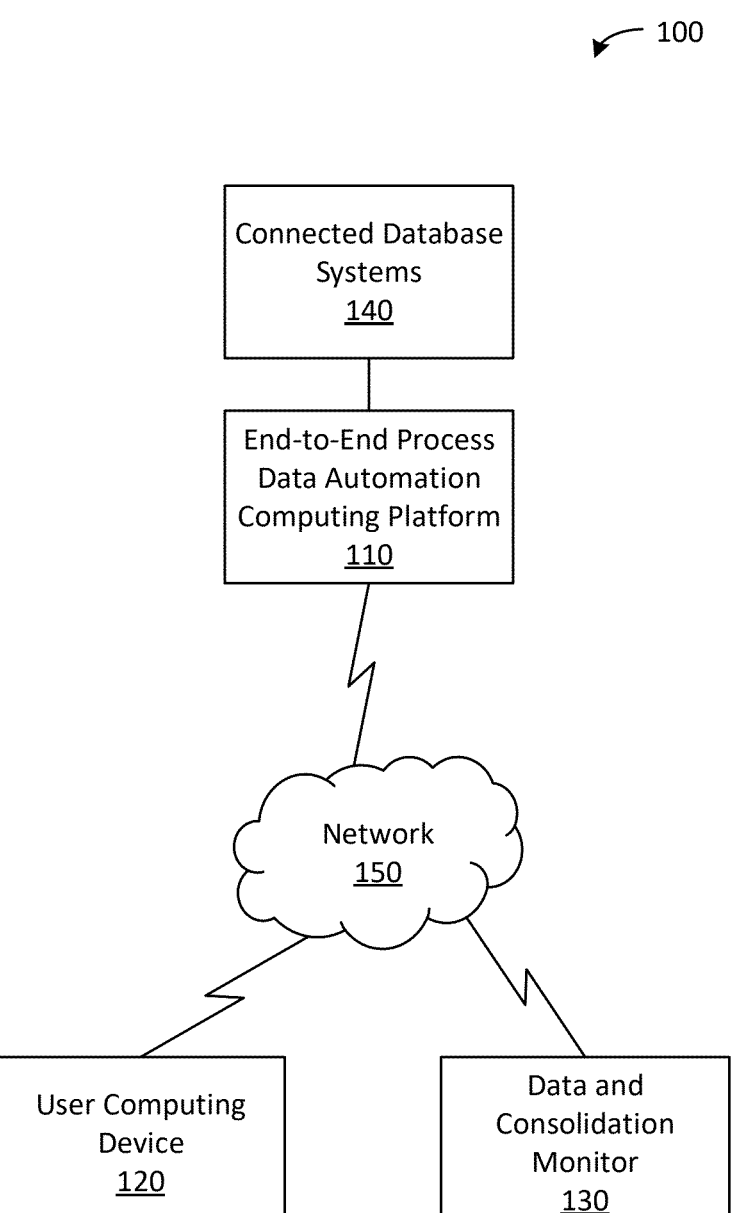
FIG. 1 depicts an illustrative computing environment for holistic end-to-end process data automation in accordance with some example embodiments.

FIG. 1 depicts an illustrative computing environment 100 for holistic end-to-end process data automation in accordance with some example embodiments. Referring to FIG. 1, the computing environment 100 may include one or more computing devices and/or other computing systems. For example, computing environment 100 may include an end-to-end process data automation computing platform 110, a user computing device 120, a data and consolidation monitor 130, and connected database systems 140. End-to-end process data automation computing platform 110 may include one or more computing devices configured to perform one or more of the functions described herein. In one example, as discussed in further detail below, end-to-end process data automation computing platform 110 may employ a hierarchy provided by entity closes to fit group close needs. Additionally, end-to-end process data automation computing platform 110 may implement monitors in a flexible way such that both entity close and group close can benefit. In an example implementation involving a closing process, a holistic end-to-end closing automation tool may be provided with features including one template/task list for the complete end-to-end closing process, one tool for both entity close and group close, and combined end-to-end reporting and monitoring.

User computing device 120 may be a processor-based device including, for example, a smartphone, a tablet computer, a wearable apparatus, a virtual assistant, an Internet-of-Things (IoT) appliance, and/or the like.

Data and consolidation monitor 130 may be a tool within the group reporting functionality that allows users to track and manage the process of collecting data from different company entities (e.g., consolidation units) and then consolidating the data into a unified statement. This provides a visual overview of the entire consolidation process, including the status of each task involved in data collection and consolidation. Potential issues or delays may be identified.

Connected database systems 140 may include, for example, a relational database systems, in-memory database systems, and/or the like. In some examples, the connected database systems 140 may maintain (e.g., store) various types of data, including static and nonstatic data (e.g., company codes, controlling areas, plants, consolidation groups, consolidation units, tasks, activity groups, and/or the like). The connected database systems 140 may refer to external or remote systems that are configured to interact with and exchange data with a software system (e.g., enterprise resource planning software system), allowing for seamless communication and data flow between different application or platforms within a network.

Referring again to FIG. 1, the end-to-end process data automation computing platform 110, the user computing device 120, the data and consolidation monitor 130, and the connected database systems 140, may be communicatively coupled via a network 150. The network 150 may be a wired and/or wireless network including, for example, a wide area network (WAN), local area network (LAN), a virtual local area network (VLAN), the Internet, and/or the like.

Figure 3:
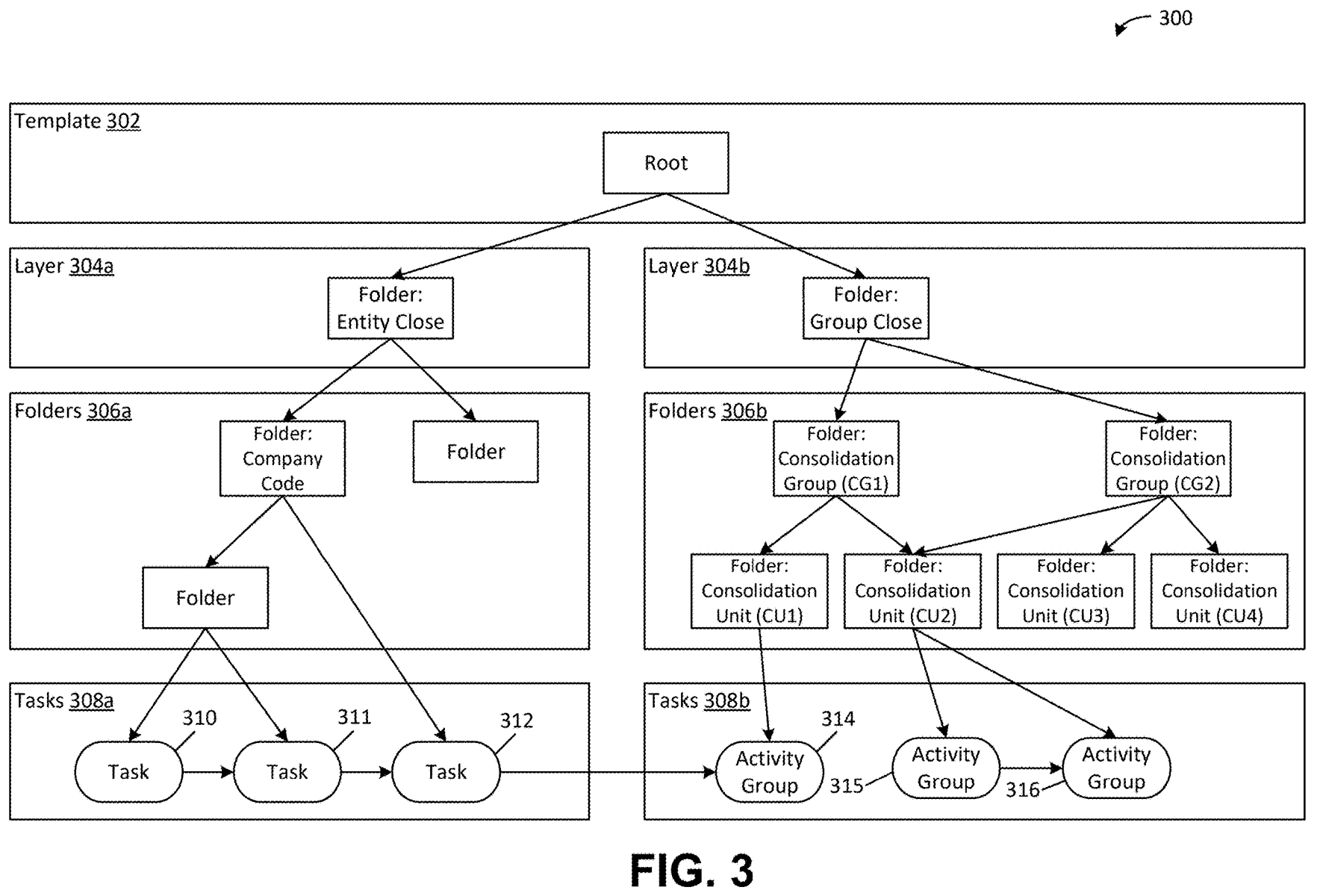
Figure 4:
FIG. 4 depicts a table illustrating a monitor associated with holistic end-to-end process data automation in accordance with some example embodiments.

FIGS. 2 through 4 will be discussed together. FIG. 2 depicts a flowchart 200 illustrating a process for implementing holistic end-to-end process data automation in accordance with some example embodiments. FIG. 3 depicts a graph hierarchy 300 illustrating holistic end-to-end process data automation in accordance with some example embodiments. FIG. 4 depicts a table 400 illustrating a monitor associated with holistic end-to-end process data automation in accordance with some example embodiments.

Referring to FIG. 2, at step 202, a computing platform (e.g., end-to-end process data automation computing platform 110) may identify process data including entity-level data and group-level data in connected database systems. Processes may be started in the connected database system. The data as such is stored and maintained in the database landscape (e.g., multiple databases in a heterogeneous database system). The entity-level data may include individual tasks. The group-level data may include sets of tasks to be executed in a predefined sequence/order (defined via index).

At step 204, the computing platform may synchronize the group-level data with the entity-level data by mapping respective content and configurations. The computing platform may synchronize metadata from underlying systems in order to determine the structure of the entity-level data (e.g., which organizational units exist in the connected systems).

At step 206, the computing platform may generate a logical tree structure for the entity-level data and the group-level data. In doing so, the computing platform may divide the logical tree structure into a first subtree of nodes representing the entity-level data (e.g., left side of FIG. 3 at 304a, 306a, 308a) and a second subtree of nodes representing the group-level data (e.g., right side of FIG. 3 at 304b, 306b, 308b) via a topmost sub-hierarchy layer of the logical tree structure. As shown in FIG. 3, the first subtree and the second subtree are connected according to a same root node (e.g., at template layer 302) such that entity-level data and group-level data are represented by separate subtrees within a common hierarchy.

Layer 304a, 304b introduces a new folder layer right below the header/root (e.g., called a "flavor layer"). Each folder in this layer indicates a type of process data and associated tasks involved. For instance, in a closing process, each folder in this layer may be of type "entity close" (representing entity close related tasks) or type "group close" (representing group close related tasks). In addition, dependencies may be maintained between the individual tasks associated the entity-level data (e.g., tasks 310, 311, 312) and the sets of tasks associated with the group-level data (e.g., activity groups 314, 315, 316). Activity groups, instead of tasks, may be appended in a sub-hierarchy (e.g., 308b) below the folders (e.g., 306a, 306b). In this way, group closes related activity groups/tasks may be integrated into the hierarchy. In some examples, the second subtree of nodes representing the group-level data may include consolidation units (CUs) and consolidation groups (CGs). A consolidation unit may represent an entity (e.g., a minimum or basic entity) of a group structure used as a basis for performing a consolidation. For example, two or more consolidation units may be merged together to form a single consolidation group. In some examples, versions may define subsets of activity groups to be processed. Versions may be modeled as a new folder in the hierarchy and enables users to choose a version when generating an instance.

As shown in FIG. 3, the dependency logic is extended, allowing multiple parents (and thus the assignment of consolidation units (CUs) to multiple consolidation groups (CGs)). Dependencies may be maintained between tasks on the entity side to activity groups (or to specific tasks in an activity group) on the consolidation side. With the help of dependencies between tasks of the entity close (e.g., tasks 308a) and tasks/activity groups on the consolidation unit side (e.g., tasks 308b), a technical connection between entity-level data and the group-level data may be made.

Returning to FIG. 2, at step 208, the computing platform may generate an instance from the logical tree structure based on one of the first subtree or the second subtree. For example, a template (e.g., that establishes a hierarchy and tasks) may be used to generate an instance for a specific key date (e.g., a particular date during a quarter or a year). Generation of instances from a template based on the combined hierarchy allows to restrict to one of the subtrees (e.g., "entity close" or "group close"). This provides maximum flexibility to either work on the processes separately or in a combined way. Parameters related to the key date are automatically set (e.g., filled) for a specific instance.

At step 210, the computing platform may output, based on the generated instance, a consolidated report unifying the entity-level data and the group-level data. In some examples, the computing platform may calculate a combined status for the individual tasks and the sets of tasks on a folder level (e.g., 306a, 306b). For instance, the computing platform may derive a combined task from all the underlying tasks/activity groups by choosing the worst underlying case as the combined status on the folder level. The status information may be propagated from the task and activity groups (e.g., 308a, 308b) to the folders (e.g., 306a, 306b). This information may be provided to a data and consolidation monitor (e.g., data and consolidation monitor 130). The activity groups and the propagation of the combined status to the folders enables a flexible approach to monitor the activities in the consolidation.

In this regard, FIG. 4 depicts a table 400 illustrating implementation of the monitors. As shown in FIG. 4, a combined status may be provided on all folders. A metrics view may be generated (consolidation groups vs. activity groups). For example, a matrix based on the folders may include activity group headers (e.g., activity groups AG1 through AG8) associated with the processing of tasks within a folder. The rows may be configurable for underlying folders (e.g., consolidation groups CG1, CG2). Each folder representing an activity group (AG1 through AG8) may have a status displayed (e.g., in a column). By defining or choosing a consolidation group (CG1, CG2, etc.), and adding folders representing the activity groups (AG through AG8), custom monitoring (e.g., plug and play matrix view) may be performed based on various needs. Status values may include, for example: in process, completed without errors, completed with warnings, completed with errors, or checked.

Figure 5:
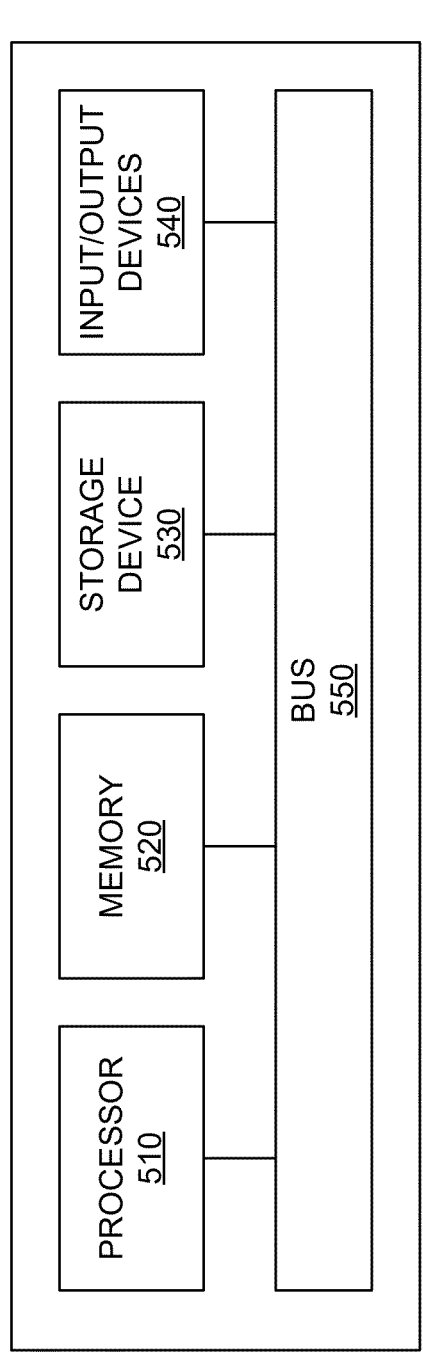
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1-5, the computing system 500 can be used to implement holistic end-to-end process data automation operations and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, end-to-end process data automation operations in flowchart 200. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid-state device, a floppy disk device, a hard disk device, an optical disk device, a tape device, and/or any other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method comprising:

identifying process data comprising entity-level data and group-level data in connected database systems, wherein the entity-level data comprises individual tasks, and wherein the group-level data comprises sets of tasks to be executed in a predefined sequence;

synchronizing the group-level data with the entity-level data by mapping respective content and configurations;

generating a logical tree structure for the entity-level data and the group-level data, wherein the generating comprises dividing, via a topmost sub-hierarchy layer of the logical tree structure, the logical tree structure into a first subtree of nodes representing the entity-level data and a second subtree of nodes representing the group-level data;

generating an instance from the logical tree structure based on one of the first subtree or the second subtree; and outputting, based on the generated instance, a consolidated report unifying the entity-level data and the group-level data.

Example 2: The computer-implemented method of Example 1, wherein the first subtree and the second subtree are connected according to a same root node.

Example 3: The computer-implemented method of any of Examples 1-2, wherein the sub-hierarchy layer comprises a folder layer indicating a type of process data and associated tasks.

Example 4: The computer-implemented method of any of Examples 1-3, further comprising: maintaining dependencies between the individual tasks associated the entity-level data and the sets of tasks associated with the group-level data.

Example 5: The computer-implemented of any of Examples 1-4, wherein the second subtree of nodes representing the group-level data comprises: consolidation units and consolidation groups, wherein two or more consolidation units are merged together to form a single consolidation group.

Example 6: The computer-implemented of any of Examples 1-5, wherein generating an instance from the logical tree structure based on one of the first subtree or the second subtree comprises generating the instance for a specific key date.

Example 7: The computer-implemented of any of Examples 1-6, wherein generating the consolidated report unifying entity-level data and the group-level data comprises calculating a combined status for the individual tasks and the sets of tasks on a folder level.

Example 8: A system comprising:

at least one processor; and at least one memory including program code which when executed causes the system to provide operations comprising:

identifying process data comprising entity-level data and group-level data in connected database systems, wherein the entity-level data comprises individual tasks, and wherein the group-level data comprises sets of tasks to be executed in a predefined sequence;

synchronizing the group-level data with the entity-level data by mapping respective content and configurations;

generating a logical tree structure for the entity-level data and the group-level data;

dividing, via a topmost sub-hierarchy layer of the logical tree structure, the logical tree structure into a first subtree of nodes representing the entity-level data and a second subtree of nodes representing the group-level data;

generating an instance from the logical tree structure based on one of the first subtree or the second subtree; and outputting a consolidated report unifying the entity-level data and the group-level data based on the generated instance.

Example 9: The system of Example 8, wherein the first subtree and the second subtree are connected according to a same root node.

Example 10: The system of any of Examples 8-9, wherein the sub-hierarchy layer comprises a folder layer indicating a type of process data and associated tasks.

Example 11: The system of any of Examples 8-10, the operations further comprising: maintaining dependencies between the individual tasks associated the entity-level data and the sets of tasks associated with the group-level data.

Example 12: The system of any of Examples 8-11, wherein the second subtree of nodes representing the group-level data comprises: consolidation units and consolidation groups, wherein two or more consolidation units are merged together to form a single consolidation group.

Example 13: The system of any of Examples 8-12, wherein generating an instance from the logical tree structure based on one of the first subtree or the second subtree comprises generating the instance for a specific key date.

Example 14: The system of any of Examples 8-13, wherein generating the consolidated report unifying entity-level data and the group-level data comprises calculating a combined status for the individual tasks and the sets of tasks on a folder level.

Example 15: A non-transitory computer-readable storage medium including program code which when executed by at least one processor causes operations comprising:

identifying process data comprising entity-level data and group-level data in connected database systems, wherein the entity-level data comprises individual tasks, and wherein the group-level data comprises sets of tasks to be executed in a predefined sequence;

synchronizing the group-level data with the entity-level data by mapping respective content and configurations;

generating a logical tree structure for the entity-level data and the group-level data;

dividing, via a topmost sub-hierarchy layer of the logical tree structure, the logical tree structure into a first subtree of nodes representing the entity-level data and a second subtree of nodes representing the group-level data;

generating an instance from the logical tree structure based on one of the first subtree or the second subtree; and outputting a consolidated report unifying the entity-level data and the group-level data based on the generated instance.

Example 16: The non-transitory computer-readable storage medium of Example 15, wherein the first subtree and the second subtree are connected according to a same root node.

Example 17: The non-transitory computer-readable storage medium of Example 15-16, wherein the sub-hierarchy layer comprises a folder layer indicating a type of process data and associated tasks.

Example 18: The non-transitory computer-readable storage medium of Example 15-17, the operations further comprising: maintaining dependencies between the individual tasks associated the entity-level data and the sets of tasks associated with the group-level data.

Example 19: The non-transitory computer-readable storage medium of Example 15-18, wherein the second subtree of nodes representing the group-level data comprises: consolidation units and consolidation groups, wherein two or more consolidation units are merged together to form a single consolidation group.

Example 20: The non-transitory computer-readable storage medium of Example 15-19, wherein generating an instance from the logical tree structure based on one of the first subtree or the second subtree comprises generating the instance for a specific key date.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method comprising:

identifying process data comprising entity-level data and group-level data in connected database systems, wherein the entity-level data comprises individual tasks, and wherein the group-level data comprises sets of tasks to be executed in a predefined sequence;

synchronizing the group-level data with the entity-level data by mapping respective content and configurations;

generating a logical tree structure for the entity-level data and the group-level data, wherein the generating comprises dividing, via a topmost sub-hierarchy layer of the logical tree structure, the logical tree structure into a first subtree of nodes representing the entity-level data and a second subtree of nodes representing the group-level data;

generating an instance from the logical tree structure based on one of the first subtree or the second subtree; and outputting, based on the generated instance, a consolidated report unifying the entity-level data and the group-level data.

2. The computer-implemented method of claim 1, wherein the first subtree and the second subtree are connected according to a same root node.

3. The computer-implemented method of claim 1, wherein the sub-hierarchy layer comprises a folder layer indicating a type of process data and associated tasks.

4. The computer-implemented method of claim 1, further comprising:

maintaining dependencies between the individual tasks associated the entity-level data and the sets of tasks associated with the group-level data.

5. The computer-implemented method of claim 1, wherein the second subtree of nodes representing the group-level data comprises: consolidation units and consolidation groups, wherein two or more consolidation units are merged together to form a single consolidation group.

6. The computer-implemented method of claim 1, wherein generating an instance from the logical tree structure based on one of the first subtree or the second subtree comprises generating the instance for a specific key date.

7. The computer-implemented method of claim 1, wherein generating the consolidated report unifying entity-level data and the group-level data comprises calculating a combined status for the individual tasks and the sets of tasks on a folder level.

8. A system comprising:

at least one processor; and at least one memory including program code which when executed causes the system to provide operations comprising:

identifying process data comprising entity-level data and group-level data in connected database systems, wherein the entity-level data comprises individual tasks, and wherein the group-level data comprises sets of tasks to be executed in a predefined sequence;

synchronizing the group-level data with the entity-level data by mapping respective content and configurations;

generating a logical tree structure for the entity-level data and the group-level data;

dividing, via a topmost sub-hierarchy layer of the logical tree structure, the logical tree structure into a first subtree of nodes representing the entity-level data and a second subtree of nodes representing the group-level data;

generating an instance from the logical tree structure based on one of the first subtree or the second subtree; and outputting a consolidated report unifying the entity-level data and the group-level data based on the generated instance.

9. The system of claim 8, wherein the first subtree and the second subtree are connected according to a same root node.

10. The system of claim 8, wherein the sub-hierarchy layer comprises a folder layer indicating a type of process data and associated tasks.

11. The system of claim 8, the operations further comprising:

maintaining dependencies between the individual tasks associated the entity-level data and the sets of tasks associated with the group-level data.

12. The system of claim 8, wherein the second subtree of nodes representing the group-level data comprises: consolidation units and consolidation groups, wherein two or more consolidation units are merged together to form a single consolidation group.

13. The system of claim 8, wherein generating an instance from the logical tree structure based on one of the first subtree or the second subtree comprises generating the instance for a specific key date.

14. The system of claim 8, wherein generating the consolidated report unifying entity-level data and the group-level data comprises calculating a combined status for the individual tasks and the sets of tasks on a folder level.

15. A non-transitory computer-readable storage medium including program code which when executed by at least one processor causes operations comprising:

identifying process data comprising entity-level data and group-level data in connected database systems, wherein the entity-level data comprises individual tasks, and wherein the group-level data comprises sets of tasks to be executed in a predefined sequence;

synchronizing the group-level data with the entity-level data by mapping respective content and configurations;

generating a logical tree structure for the entity-level data and the group-level data;

dividing, via a topmost sub-hierarchy layer of the logical tree structure, the logical tree structure into a first subtree of nodes representing the entity-level data and a second subtree of nodes representing the group-level data;

generating an instance from the logical tree structure based on one of the first subtree or the second subtree; and outputting a consolidated report unifying the entity-level data and the group-level data based on the generated instance.

16. The non-transitory computer-readable storage medium of claim 15, wherein the first subtree and the second subtree are connected according to a same root node.

17. The non-transitory computer-readable storage medium of claim 15, wherein the sub-hierarchy layer comprises a folder layer indicating a type of process data and associated tasks.

18. The non-transitory computer-readable storage medium of claim 15, the operations further comprising:

maintaining dependencies between the individual tasks associated the entity-level data and the sets of tasks associated with the group-level data.

19. The non-transitory computer-readable storage medium of claim 15, wherein the second subtree of nodes representing the group-level data comprises: consolidation units and consolidation groups, wherein two or more consolidation units are merged together to form a single consolidation group.

20. The non-transitory computer-readable storage medium of claim 15, wherein generating an instance from the logical tree structure based on one of the first subtree or the second subtree comprises generating the instance for a specific key date.

\* \* \* \* \*